UNITED STATES PATENT OFFICE.

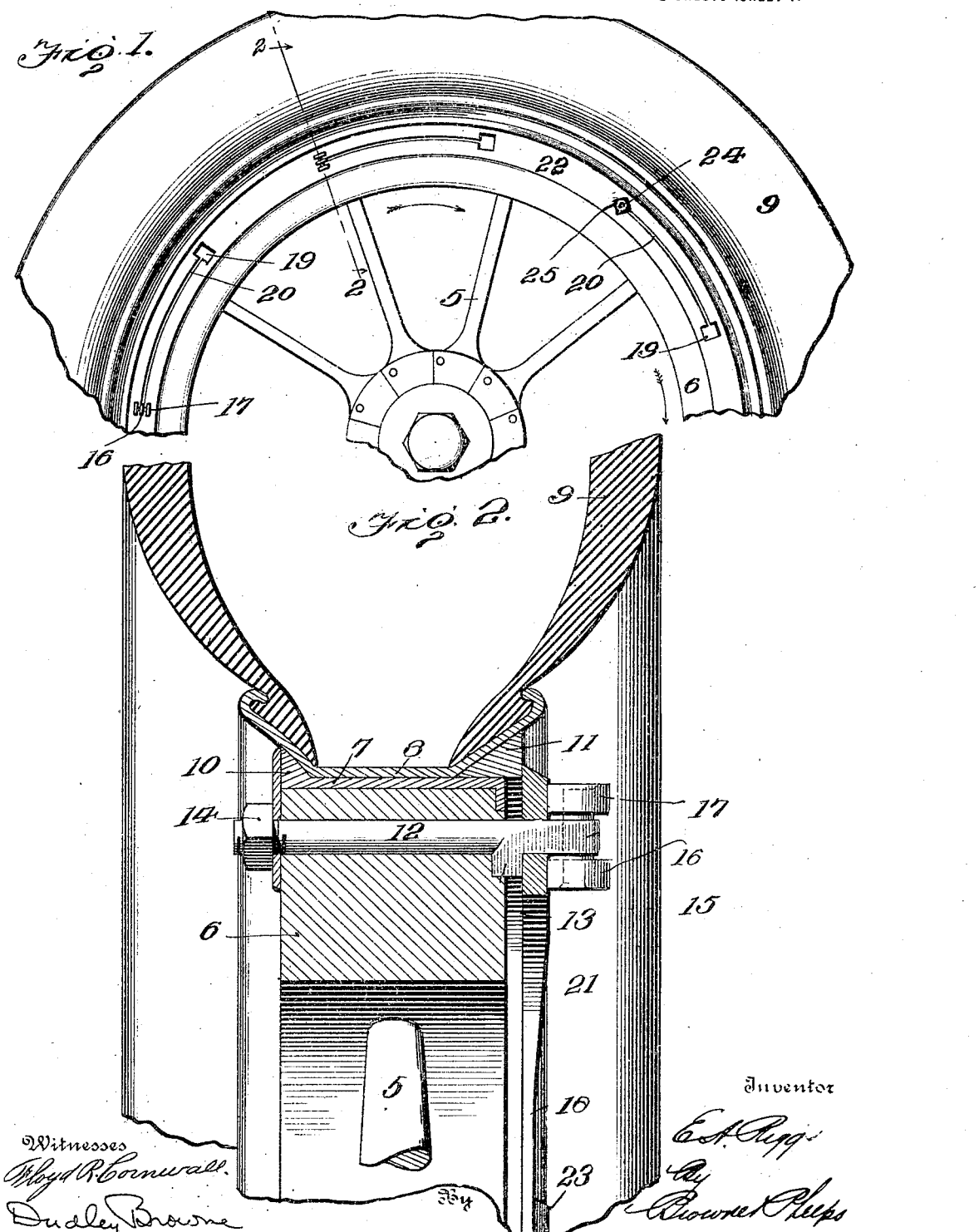

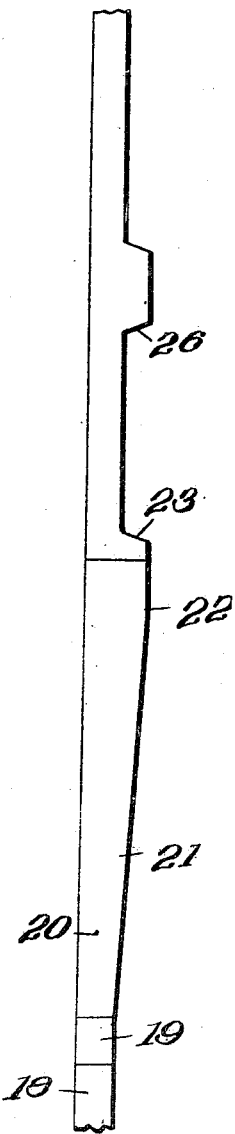
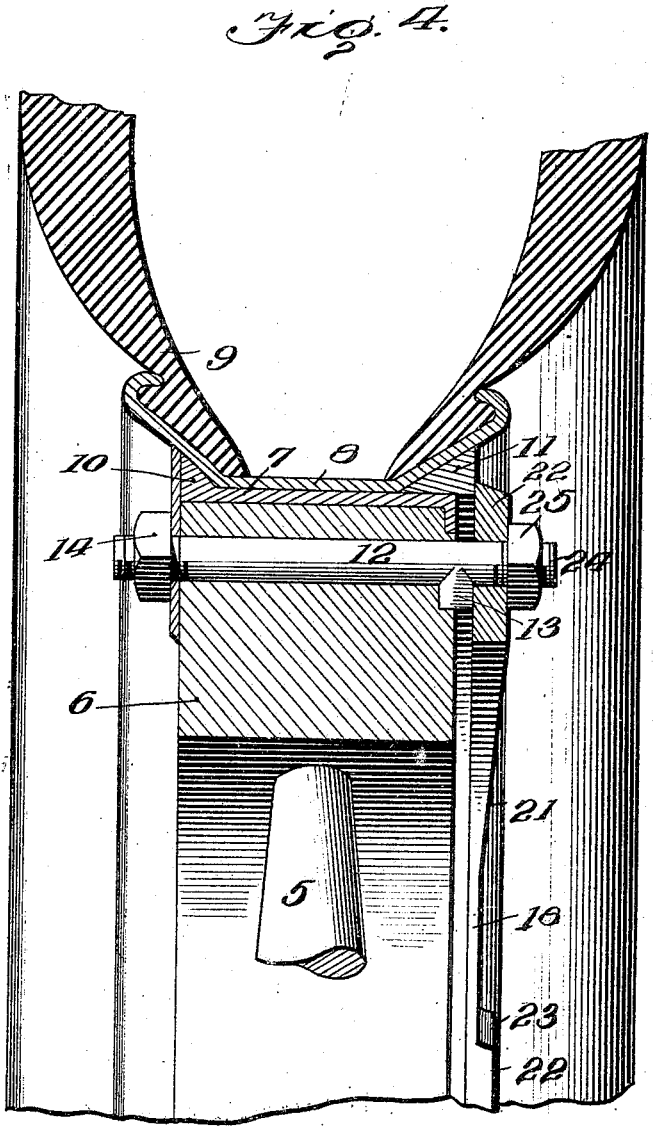

EUGENE A. RIGGS, OF TERRE HAUTE, INDIANA, ASSIGNOR OF ONE-HALF TO HARRY E. ROACH, OF TERRE HAUTE, INDIANA.

DEMOUNTABLE RIM.

1,148,860.  Specification of Letters Patent.  Patented Aug. 3, 1915.

Application filed April 9, 1915. Serial No. 20,168.

*To all whom it may concern:*

Be it known that I, EUGENE A. RIGGS, a citizen of the United States, residing at Terre Haute, in the county of Vigo and State of Indiana, have invented certain new and useful Improvements in Demountable Rims, of which the following is a specification.

This invention relates to demountable rims and more particularly to that class of such devices adapted to be used with pneumatic tires.

The primary object of this invention is the provision of a demountable rim for pneumatic tires with a simple and effective device for locking the rim in proper position upon the wheel.

A further object of this invention is to provide a demountable rim of the character set forth which shall be easy to attach and remove, thus simplifying the removal and replacement of a tire.

A still further object of this invention is the construction of a device of this character with a view toward economy, thus lessening the cost of the necessary tire equipment.

With these and other objects in view, as will hereinafter appear, this invention consists of the novel arrangement and peculiar combination of the various related elements of a demountable rim as hereinafter set forth, and more particularly pointed out in the appended claims.

Referring to the drawing forming a portion of this specification and in which similar reference characters indicate similar parts wherever used, Figure 1 is a side elevation of a portion of a wheel embodying the preferred form of the invention; Fig. 2 is a fragmentary section on line 2—2 of Fig. 1; Fig. 3 is a fragmentary detail of the locking ring, and Fig. 4 is a fragmentary detail section showing the means for holding the locking ring securely in position.

5 designates a wheel of any usual or suitable construction provided with the felly 6 upon which is mounted the usual felly band 7, which in turn is surrounded by the demountable rim 8 adapted to carry the pneumatic tire 9. The construction of the rim and tire as herein shown is of the standard clencher type but may be of any construction. Upon the felly band 7, and integral therewith is provided the usual positioning ring 10 engaging the demountable rim part 8 in order to sustain the same upon the felly.

11 designates an annular wedge member adapted to force the demountable rim 8 against the flange 10 of the band 7. A plurality of bolts 12 pass through the felly 6 having lugs 13 integral therewith to prevent turning of the bolt and canting of ring 18 and are held in position by nuts 14 upon the inner side of the wheel 5. At their extreme outer ends the bolts 12 are provided with transverse pins 15 carrying bronze or brass rollers 16—17.

The wedge member 11 is forced into position by means of a locking ring 18 provided at suitable intervals with openings 19 from which extend slots 20. From the openings 19 and along the length of the slots 20 the ring 18 gradually increases in thickness, forming a plurality of inclines 21 terminating in flattened portions 22 forming shoulders 23.

In the construction shown in Fig. 4, the rollers 16 and 17 and the transverse pin 15 are dispensed with, the bolt 12 having its head threaded at 24 in order to receive a nut 25 which acts upon the flattened portion 22 of the ring 18 in the same manner as do the rollers 16 and 17 when the nut 25 is tightened upon the surface 22. This forms a fastening for the locking ring 18 to prevent any accidental loosening thereof. Should it be desired to remove the tire the nut 25 is loosened and by tapping upon the lug 26 a reverse movement given and the ring 18 thus disengaging the rollers 16 and 17 from the surface 22 freeing the ring.

The tire 9 upon the rim 8 is placed on the felly band between the members 10 and 11 in the usual manner. The ring 18 is then placed in position, the heads of the bolts 12 carrying the bronze rollers 16 and 17 passing through the apertures 19. By means of a hammer or other suitable instrument applied upon the shoulders 23 the ring 18 is then caused to move in the direction of the arrow in Fig. 1, which causes the inner edges of the rollers 16, 17 to travel up the inclines 21, forcing the ring against the wedge member 11 to cause it to hold the rim 8 in position between the said member 11 and the lug 10. The lug 13 on the bolt 12 prevents any canting of the ring 18, thus insuring proper pressure upon the wedge 11.

The flattened portion 22 at the thickest portion of the ring 18 holds the ring in position by engaging the rollers 16, 17 and the wedge 11, it being necessary to disengage the rollers from the portion 22 by reversing the direction of the movement of the ring in order to replace the tire.

As many changes could be made in the above construction and many apparently widely different embodiments of our invention could be made, without departing from the scope thereof, it is intended that all matter contained in the above description or shown in the accompanying drawing shall be interpreted as illustrative and not in a limiting sense.

Having thus described my invention what I claim as new and desire to secure by Letters Patent is:

1. In a wheel, the combination with a rim and a felly, of a plurality of bolts extending from said felly, antifriction rollers upon each of said bolts, a ring having slots adapted to receive the said bolts, inclined faces upon said ring adapted to be engaged by said antifriction rollers, and means between said ring and said rim adapted to be operated by the former to sustain the latter in proper position.

2. In a wheel, the combination with a felly and a rim, of a wedge member engaging said rim, a plurality of bolts extending from said felly, antifriction rollers on said bolts, a locking ring provided with inclined faces adapted to engage the antifriction rollers of said bolts, a lug on each of said bolts, the heads of said bolts and the inclined faces of said ring being so disposed that movement of the ring will cause the antifriction rollers of said bolts to ride upon the inclined faces whereby to cause said ring to act upon said wedge member to hold the rim in proper position.

3. In a wheel, the combination with a felly, a demountable rim thereon, a wedge member engaging said rim, a plurality of bolts extending from said felly, antifriction rollers on said bolts, a locking ring provided with bayonet slots to engage said antifriction rollers, a plurality of inclined faces on said locking ring, the antifriction rollers on said bolts and the inclined faces of said ring being so located that movement of the ring in the proper direction will cause the antifriction rollers to ride upon the inclined faces whereby to cause said ring to act upon said wedge member to hold the rim in proper position.

4. In a wheel, the combination with a felly, of a demountable rim thereon, a plurality of bolts extending from the felly, said bolts being provided with antifriction rollers, and a locking ring having inclined faces adapted to engage said antifriction rollers to hold the said ring and rim in place.

In testimony whereof I affix my signature in presence of two witnesses.

EUGENE A. RIGGS.

Witnesses:
HARRY E. ROACH,
W. L. BALLARD.